March 12, 1963  M. P. LAUGHLIN ET AL  3,081,004
CHEMICAL FEEDER PACKAGE FOR ATTACHMENT
TO LAWN MOWERS OR THE LIKE
Filed Nov. 9, 1959  2 Sheets-Sheet 1

INVENTORS
Myron Penn Laughlin
Edmund Quincy Moses
BY

*Moses, Nolte & Nolte*

ATTORNEYS.

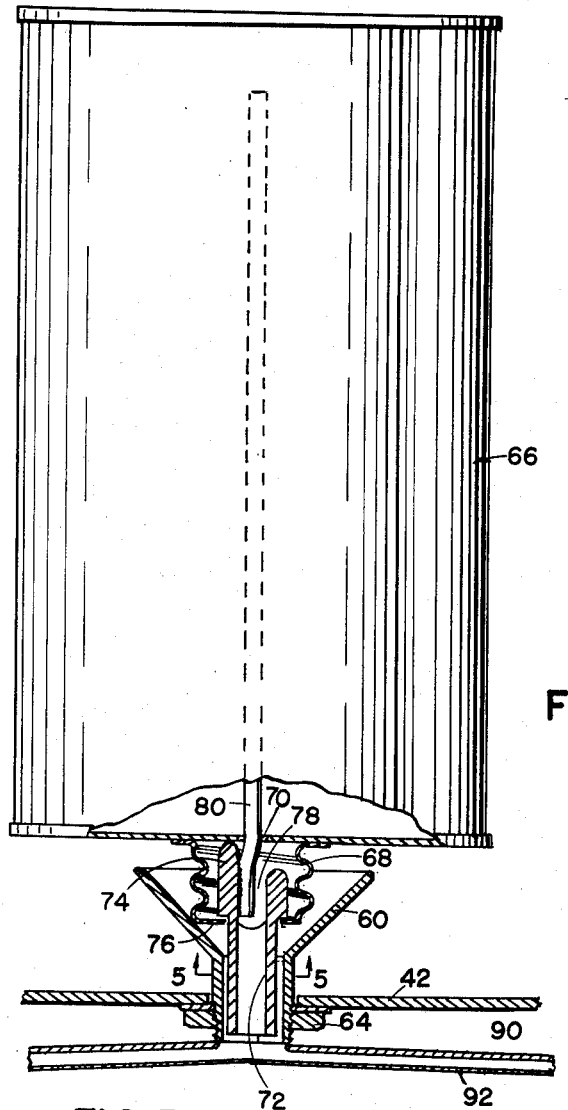
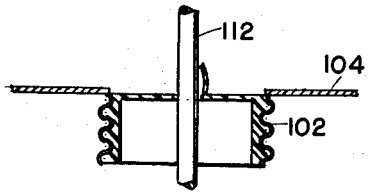
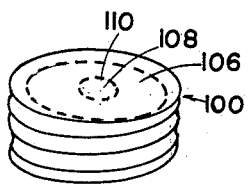
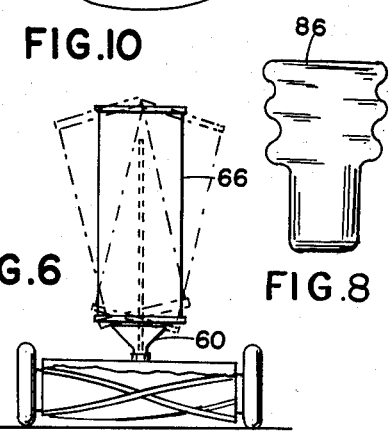
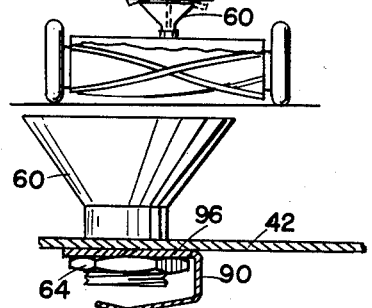
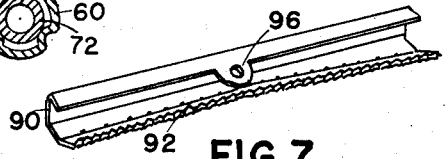
INVENTORS
Myron Penn Laughlin
Edmund Quincy Moses
BY
ATTORNEYS.

United States Patent Office 3,081,004
Patented Mar. 12, 1963

3,081,004
CHEMICAL FEEDER PACKAGE FOR ATTACH-
MENT TO LAWN MOWERS OR THE LIKE
Myron Penn Laughlin, 1705 Beach Drive SE., St. Petersburg, Fla., and Edmund Quincy Moses, 11 W. 42nd St., New York 36, N.Y.
Filed Nov. 9, 1959, Ser. No. 851,787
5 Claims. (Cl. 222—161)

This invention relates to means for dispensing and applying growth control agents such as fertilizers, retarders and weed killers, and particularly to dispensing packages for use in connection with attachments mounted upon lawn mowers or other garden implements. In accordance with the present invention, the garden implement, such as a lawn mower, is provided with an attachment or fitting for receiving a package of the chemical having an orifice for discharging the treating agent in the proper location for application to the vegetation being treated, the package or receptacle preferably being thrown away as soon as empty and replaced with a new package.

A particularly effective means of feeding treating agents consists in providing a vibrating stirring and metering member such as a wire or rod contained within the package and extending through a metering orifice at the bottom of the package and free to vibrate therein. The flow is metered by choosing an orifice of proper size with respect to rod diameter, the relative dimensions selected depending on the flow characteristics of the contents of the package. The fitting, receptacle, and rod shake by reason of the movement of the lawn mower or other implement over the ground thereby causing a controlled flow of the treating ingredient through the orifice at the bottom of the receptacle. The treating agent may be either in powder, granular, or liquid form.

In the accompanying drawings which illustrate certain preferred examples of the invention:

FIG. 3 is a view partly in elevation and partly in vertical section showing a modified form of package;

FIG. 4 is a vertical section showing the funnel member of the lawn mower fitting at right angles to the position shown in FIG. 3, the funnel member being shown in elevation;

FIG. 5 is in a horizontal section on line 5—5 of FIG. 3;

FIG. 6 is a diagrammatic view showing the package applied to a reel lawn mower, the vibration or shaking of the package being indicated by broken lines;

FIG. 7 is a perspective view of a portion of the distributing trough shown in FIGS. 5 and 6;

FIG. 8 is a perspective view of a closure cap for the container shown in FIG. 3;

FIG. 9 is a transverse section of the bottom of a package or can having a threaded stem in which a plastic insert is located;

FIG. 10 is a perspective view of the plastic insert shown in FIG. 9.

Figure 1:
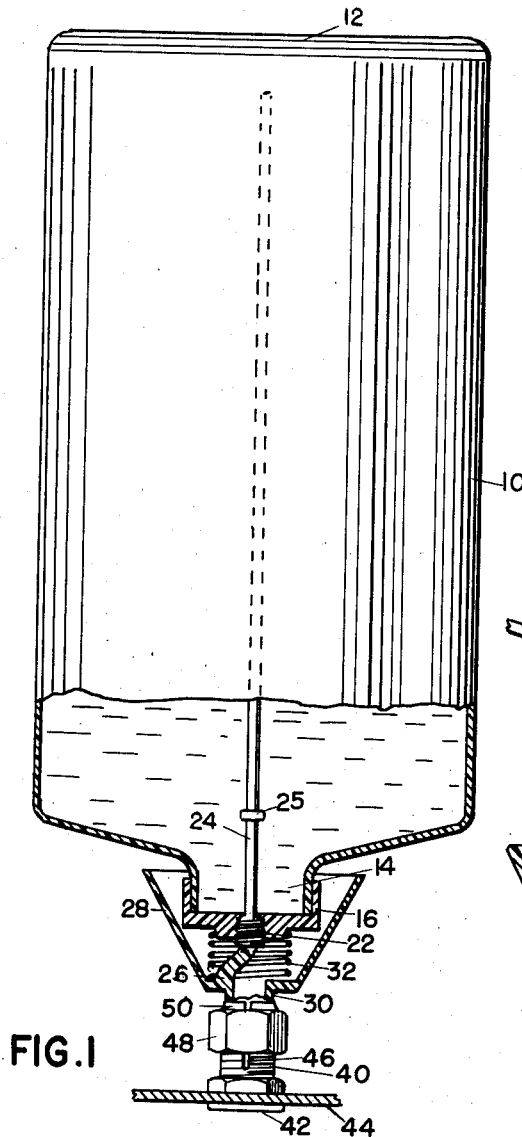
FIGURE 1 is a side elevation, partly in vertical section, of a sealed package comprising a disposable receptacle and vibratory stirring and metering rod therein, filled with a suitable treating agent, and including a funnel or spout member for application to the lawn mower fitting.
Figure 2:
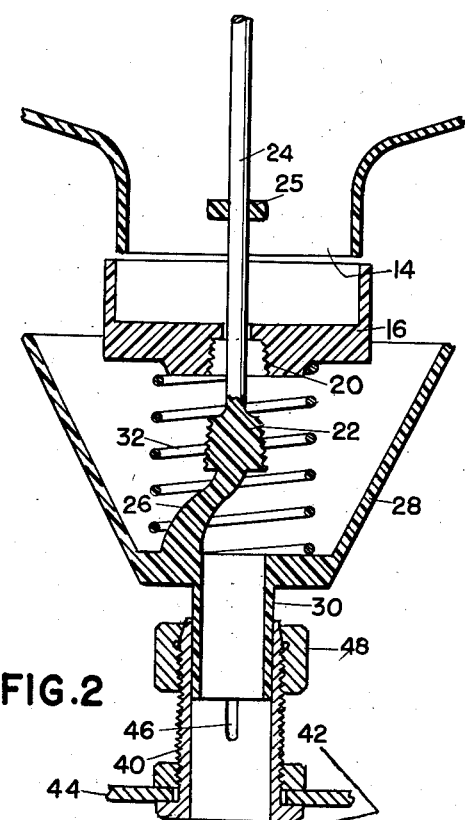
FIG. 2 is a vertical section showing the lower part of the package of FIG. 1 on an enlarged scale, the closure and metering elements being separated from the container. This figure also shows the stem of the funnel or spout member fitted in a lawn mower fitting.

Referring to the drawings in detail the package shown in FIGS. 1 and 2 comprises a container 10 having a permanently closed top 12 and a filling opening 14 in the bottom thereof. This container may be made of metal, paper or any other suitable material, but as illustrated, it comprises a container molded or blown to form, made of a suitable plastic such as polyethylene. After the container is filled, the opening 14 is closed by means of a cap or plug member 16 which has a metering orifice 18 therein and a threaded socket 20. Into the socket is fitted or screwed a removable plug 22 which is mounted on a rod or wire 24 which extends through the metering orifice and to a point towards the top of the container. The rod preferably carries a stop member 25 which prevents the rod from being withdrawn through the metering orifice 18. The lower offset part 26 of the rod is mounted in a funnel-like spout member 28 having a stem 30. A spring 32 is preferably interposed between the cap member 16 and the spout member 28 so that when the plug 22 is unscrewed from its socket, the spring will lift the container away from the spout member so as to hold it free of the plug 22 and permit a controlled flow of the contents of the container through the orifice 18 into the spout member. By properly proportioning the diameters of the orifice and the rod a proper amount of space is provided around the rod to permit metered flow when the rod and receptacle are shaken or vibrated. The size of the orifice chosen will depend upon the character of the material in the package and whether the latter be a granular or powdered material or a liquid. The size of the outlet space ordinarily will not permit a free flow of the material except when the rod and container are vibrated. The rod 24 may be of metal or preferably of plastic in which latter event it may be cast integral with the spout member and plug 22. If this is done, the spout member with the rod may be assembled with the cap 16 and spring 32, the plug 22 screwed into the socket 20 and the stop member 25 then fastened on the rod. This assembly is then placed on the filled container with the rod projecting thereinto and cap 16 is permanently sealed in place as by cement or otherwise. The package is now ready for sale to the consumer, the contents being sealed in by the plug 22. A breakable seal of paper or the like may be applied in any suitable manner to prevent unauthorized tampering with the package.

For mounting the device on the lawn mower a suitable fitting is provided such for instance as that shown in FIG. 2 which comprises a threaded nipple member 40 having a head 42 fitting under the top plate 44 of the lawn mower. The threaded nipple passes through a hole in this top plate and is preferably split as indicated at 46 and carries a nut such as a wing nut 48 which engages a tapered portion 50 of the nipple. The stem 30 of the package spout member is inserted into the split nipple member and the nut 48 tightened up clamping package on the lawn mower. The operator then rotates the container 10 so as to unscrew the cap from the plug 22 whereupon the package is free to oscillate or vibrate on the spring 32 under the influence of the shaking given to it by movement of the lawn mower.

The container 10 may be made of a transparent or a translucent plastic or be provided with a window which will permit the contents to be observed so that the operator can see how much of the material has been used up and substitute a new package at the proper time. If the container itself is not transparent, the funnel spout 28 may be made of a transparent plastic which will permit the flow of material to be observed and enable the operator to replace the package when the supply of treating agent is exhausted. The use of the plastic spout, rod, plug and cap assembly provides a very inexpensive construction and one which is non-corrodible so that it is not attacked by the chemicals used in the fertilizer or other treating agent. The whole construction provides a package which can be sealed until placed in use by the purchaser and which is of such low cost that it may be discarded and replaced on an economic basis.

FIGURES 3, 4, and 5 illustrate a modified construction in which a cup or funnel member is attached to the lawn mower and the package is provided with a spout which is pushed into the funnel member. In this construction the funnel member 60 is mounted on the top plate 42 of the lawn mower by means of a fitting such as shown in FIGS. 1 and 2 or by being screwed into a hole in the top plate of the lawn mower locked therein by lock nut 64 if necessary. The container 66 may be of plastic or may be a tin can or a can with metal heads and paper sidewalls or may be made of any other suitable material. It is provided with a screw threaded neck 68 and has a metering orifice 70 formed in its bottom. Loosely mounted inside of the neck 68 is a spout member 72 which has an enlarged upper end 74 which is received loosely within the neck 68 and held therein by a flange 76 at the bottom of the neck. The part 74 is cut away to provide openings 78 to permit passage of the material from the orifice 70 down through the central hole in the spout.

Attached to the spout member and projecting up through the orifice 70 is a vibrating rod or wire 80, the size of the orifice being sufficiently larger than the diameter of the rod to permit metered flow of the material. The stem of the funnel is preferably provided with inwardly depressed ribs 82 so as to allow spaces 84 between the inside of the stem and the outside of the spout permitting any of the chemical which does not pass directly through the spout to pass down to the space above the lawn mower blades along with the material which passes through the spout. At the same time the ribs 82 hold the spout firmly with relation to the funnel and lawn mower frame.

When the package is sold, it is sealed by means of an ordinary screw cap 86 which is of such length as to enclose the lower end of the spout. When the package is to be used, it is merely necessary to remove the screw cap and push the spout down into the funnel where it is firmly held by the ribs 82. Vibration of the lawn mower will then be transmitted through the spout to the vibrating metering and stirring rod 80. The can is also free to shake in the funnel as indicated by the broken lines in FIG. 6, as it is loosely supported on the upwardly projecting portions of the enlarged upper end of the spout. Upon movement of the lawn mower the can will oscillate and the rod vibrate at different periods and regular feeding will take place through the metering orifice. Upon stopping movement of the lawn mower the vibration will stop and if the orifice and rod are properly proportioned in size, feeding will cease until movement of the lawn mower is resumed. The construction of the can and spout is very inexpensive so that the package may be discarded when empty.

FIGURES 4, 5, and 6 show a convenient means for distribution of the material when the package is used on a reel type lawn mower. For this purpose a distributing trough 90 is provided which has a bottom portion 92 extending under the outlet from the spout and from side to side of the reel. This portion 92 preferably has a slightly upturned edge which may be provided with saw teeth which permits the material to sift over the edge in a more or less uniform manner throughout the length of the trough. Small perforations 95 may also be provided in the bottom of the trough, if desired. The trough may be sloped down slightly from its center towards its ends so as to facilitate distribution. The trough may be conveniently secured in position by having a portion 96 extending from its upturned side between the nut 64 and the under side of the top plate of the lawn mower.

FIGURES 7 and 8 show a sealing member and orifice plate which may be used to seal a can of treating agent when the can is used with a lawn mower attachment to which the stirring and metering rod is affixed, in instances where the rod is not included as a part of the feeding devices attached to the can. In this instance a plastic plug 100 is screwed into a neck 102 fixed to the bottom of the can 104. The top of the plug 100 is formed by plate 106 having an orifice defining groove 108 pressed part way through the top so that the center portion 110 may be pushed out by the rod 112 when the can is applied to the lawn mower fixture.

While we have shown and described certain preferred embodiments of the invention, it will be understood changes and modifications thereof may be adopted within the spirit and scope of the invention claimed, it being our intention to protect our invention in whatever form its principles may be utilized.

We claim:

1. A dispensing and metering package for growth control chemicals, adapted for mounting upon a movable garden implement, said package comprising the following elements all embodied in the package as prepared for sale or distribution to the user:
   (a) A container for holding a supply of growth control material, said container having a metering outlet orifice in a wall thereof,
   (b) A spout member, a metering rod fixed to said spout member and projecting into said metering orifice and fitting loosely therein so as to permit the container and orifice to wobble with respect to said spout and rod as a unit, the dimensions of the rod and orifice being chosen to permit a metered feed of the growth control chemical at a rate suitable to the proper application of the said chemical to the terrain to be treated,
   (c) Said spout member being formed to provide means for temporary attachment to the garden implement,
   (d) And means for temporarily sealing said spout member and said container in an immovable relationship so as to prevent discharge of chemical through said orifice until such time as the package is to be used.

2. A construction as claimed in claim 1 in which the spout member, rod, and plug are moulded of plastic, the container having a filling opening and a closure for said filling opening, said closure having said metering orifice therein.

3. A construction as claimed in claim 1 in which the spout member includes a transparent portion through which the passage of the growth control chemicals may be observed.

4. A construction as claimed in claim 1 in which the sealing means comprises a plug member for closing the metering orifice, the container being free to wobble with respect to the rod and spout member when the container and metering orifice have been moved to separate the same from the plug member to permit discharge of the chemical through the metering orifice.

5. A dispenser for growth control chemicals comprising:
   (a) A container for the chemical having a filling opening at one end thereof,
   (b) A closure member fixed to the container for closing said filling opening, (c) Said closure member having a discharge orifice therein,
(d) A spout member, a metering rod fixed to said spout member and projecting into said discharge orifice and fitting loosely therein, so as to permit the container and orifice to wobble with respect to said spout and rod as a unit,
(e) Interlocking formations on the closure member and spout member for temporarily locking the same together,
(f) Said formations including means for sealing the orifice through said closure member,
(g) An expansion spring mounted between said closure member and said spout member, held in compressed condition when said interlocking formations are locked,
(h) Said spring being of sufficient strength to support said receptacle and its contents above said spout member when said interlocking formations are disengaged.

References Cited in the file of this patent

UNITED STATES PATENTS

| | | |
|---|---|---|
| 681,197 | Cooper | Aug. 27, 1901 |
| 1,360,768 | Lane | Nov. 30, 1920 |
| 2,720,407 | Mermelstein | Oct. 11, 1955 |
| 2,833,451 | Sherbondy | May 6, 1958 |
| 2,889,082 | West | June 2, 1959 |
| 2,921,720 | Malachick | Jan. 19, 1960 |